(12) United States Patent
Yang

(10) Patent No.: US 11,748,265 B2
(45) Date of Patent: Sep. 5, 2023

(54) MEMORY CONTROLLER AND METHOD OF OPERATING THE SAME

(71) Applicant: SK hynix Inc., Gyeonggi-do (KR)

(72) Inventor: Seung Won Yang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 44 days.

(21) Appl. No.: 17/003,351

(22) Filed: Aug. 26, 2020

(65) Prior Publication Data

US 2021/0303476 A1 Sep. 30, 2021

(30) Foreign Application Priority Data

Mar. 26, 2020 (KR) .......... 10-2020-0036676

(51) Int. Cl.
G06F 12/0891 (2016.01)
G06F 12/02 (2006.01)
G06F 12/0804 (2016.01)
G06F 1/30 (2006.01)
G06F 9/30 (2018.01)

(52) U.S. Cl.
CPC .......... G06F 12/0891 (2013.01); G06F 1/30 (2013.01); G06F 9/30047 (2013.01); G06F 12/0246 (2013.01); G06F 12/0804 (2013.01); G06F 2212/7201 (2013.01); G06F 2212/7207 (2013.01)

(58) Field of Classification Search
CPC .......... G06F 12/0891; G06F 12/0246; G06F 12/0804; G06F 1/30; G06F 2212/7201; G06F 2212/7207
See application file for complete search history.

(56) References Cited

U.S. PATENT DOCUMENTS

| | | | | | |
|---|---|---|---|---|---|
| 5,860,124 | A | * | 1/1999 | Matthews | G06F 3/0652 711/165 |
| 8,924,832 | B1 | * | 12/2014 | Lam | G06F 3/0619 711/202 |
| 2006/0282644 | A1 | * | 12/2006 | Wong | G06F 12/0246 711/206 |
| 2008/0222214 | A1 | * | 9/2008 | Tokuda | G06F 11/1076 |
| 2009/0271562 | A1 | * | 10/2009 | Sinclair | G06F 12/0246 711/103 |
| 2012/0221828 | A1 | * | 8/2012 | Fang | G06F 3/0608 711/206 |
| 2014/0207997 | A1 | * | 7/2014 | Peterson | G06F 12/0246 711/103 |
| 2014/0250155 | A1 | * | 9/2014 | Chen | G06F 16/1847 707/823 |

(Continued)

FOREIGN PATENT DOCUMENTS

| | | |
|---|---|---|
| KR | 10-2019-0054974 | 5/2019 |
| KR | 10-2019-0082513 | 7/2019 |

*Primary Examiner* — Prasith Thammavong
(74) *Attorney, Agent, or Firm* — IP & T GROUP LLP

(57) ABSTRACT

A memory controller includes a map buffer and a map update controller. The map buffer includes storage areas that respectively correspond to one or more indices. The map update controller stores metadata in a storage area corresponding to a target index among the one or more indices, and updates the metadata based on an update of mapping data for a first logical address. The metadata includes history information of a physical address mapped to the first logical address.

19 Claims, 16 Drawing Sheets

(56) References Cited

U.S. PATENT DOCUMENTS

| | | | |
|---|---|---|---|
| 2015/0134875 A1* | 5/2015 | Veal | G06F 12/0246 |
| | | | 711/102 |
| 2016/0124668 A1* | 5/2016 | Inbar | G06F 12/0246 |
| | | | 711/162 |
| 2016/0154594 A1* | 6/2016 | Kang | G06F 3/0688 |
| | | | 711/103 |
| 2017/0060698 A1* | 3/2017 | Noé | G06F 13/4282 |
| 2017/0123972 A1* | 5/2017 | Gopinath | G06F 12/0253 |
| 2017/0139781 A1* | 5/2017 | Camp | G06F 11/1451 |
| 2018/0032541 A1* | 2/2018 | Park | G06F 16/122 |
| 2020/0097188 A1* | 3/2020 | Gunda | G06F 12/1009 |
| 2020/0394131 A1* | 12/2020 | Lin | G06F 3/0608 |
| 2021/0248119 A1* | 8/2021 | Li | G06F 3/0685 |

\* cited by examiner

FIG. 7B

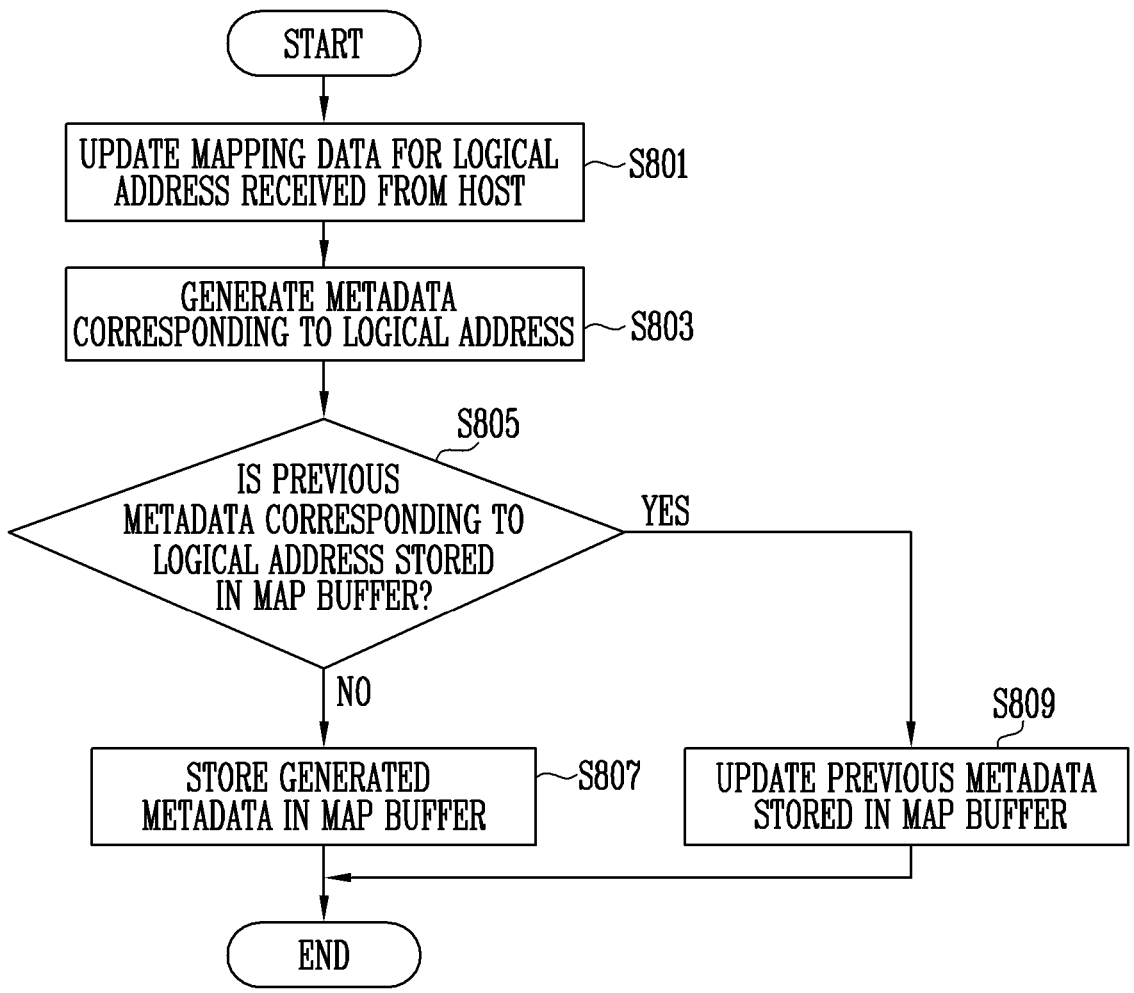

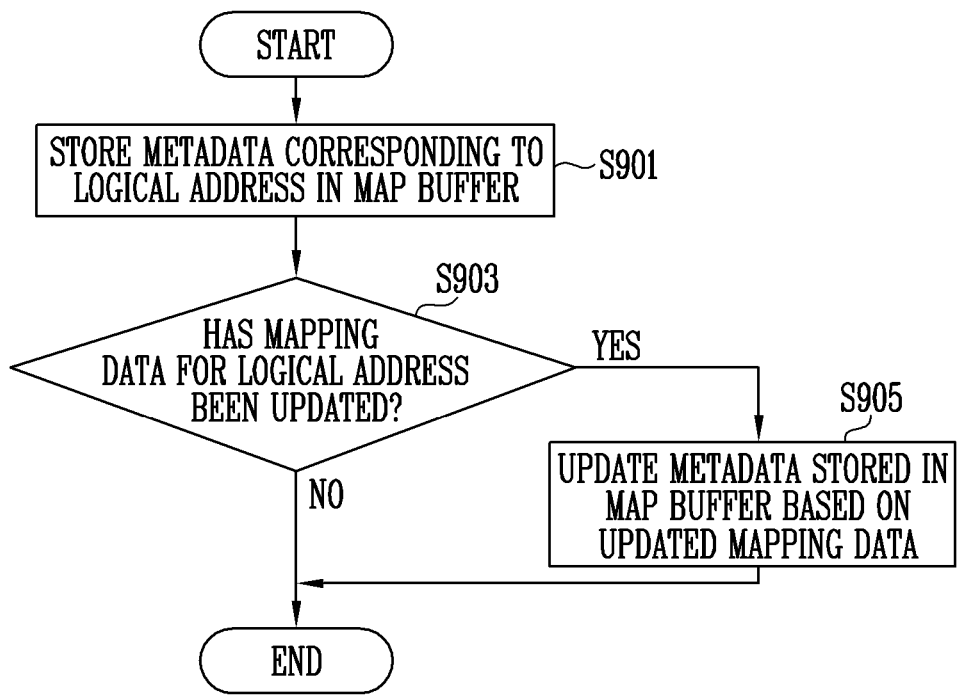

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2020-0036676, filed on Mar. 26, 2020, which is incorporated herein by reference in its entirety.

BACKGROUND

Field of Invention

Various embodiments described herein relate to a memory controller and a method of operating a memory controller.

Description of Related Art

Various types of storage devices have been developed. Generally, these devices store data under control of a computer, smartphone, or other host device, and are usually equipped with a controller for performing data storage operations for a memory.

The memory may be a volatile memory or a nonvolatile memory. A volatile memory may store data only when power is supplied. When the power is turned off or otherwise interrupted, the stored data is lost. Examples of a volatile memory include a Static Random Access Memory (SRAM) and a Dynamic Random Access Memory (DRAM). A nonvolatile memory retains the storage of data even when the supply of power is turned off or interrupted. Examples of the nonvolatile memory device include a Read Only Memory (ROM), a Programmable ROM (PROM), an Electrically Programmable ROM (EPROM), an Electrically Erasable and Programmable ROM (EEPROM), and a flash memory.

SUMMARY

Various embodiments of the present disclosure are directed to a memory controller having improved map update performance and a method of operating the memory controller.

An embodiment of the present disclosure may provide a memory controller for controlling a memory device. The memory controller may include a map buffer and a map update controller. The map buffer may include storage areas respectively corresponding to one or more indices. The map update controller may be configured to store metadata in a storage area corresponding to a target index, among the one or more indices, and to update the metadata based on an update of mapping data for a first logical address, wherein the metadata includes history information of a physical address mapped to the first logical address.

An embodiment of the present disclosure may provide for a method of operating a memory controller, the memory controller controlling a memory device and including a map buffer. The method may include storing, in the map buffer, metadata including history information of a physical address mapped to a first logical address, and updating the metadata stored in the map buffer based on mapping data for the first logical address depending on whether the mapping data for the first logical address has been updated.

BRIEF DESCRIPTION OF THE DRAWINGS

FIGS. 7A and 7B illustrate embodiments of a map update operation.
FIG. 8 illustrates an embodiment of a map update operation.
FIG. 9 illustrates an embodiment of a map update operation.

DETAILED DESCRIPTION

Specific structural or functional descriptions in the embodiments of the present disclosure introduced in this specification or application are mere examples to describe embodiments of the present disclosure. Various embodiments the present disclosure may be practiced in various forms, and should not be construed as being limited to the embodiments described in the specification or application.

Figure 1:
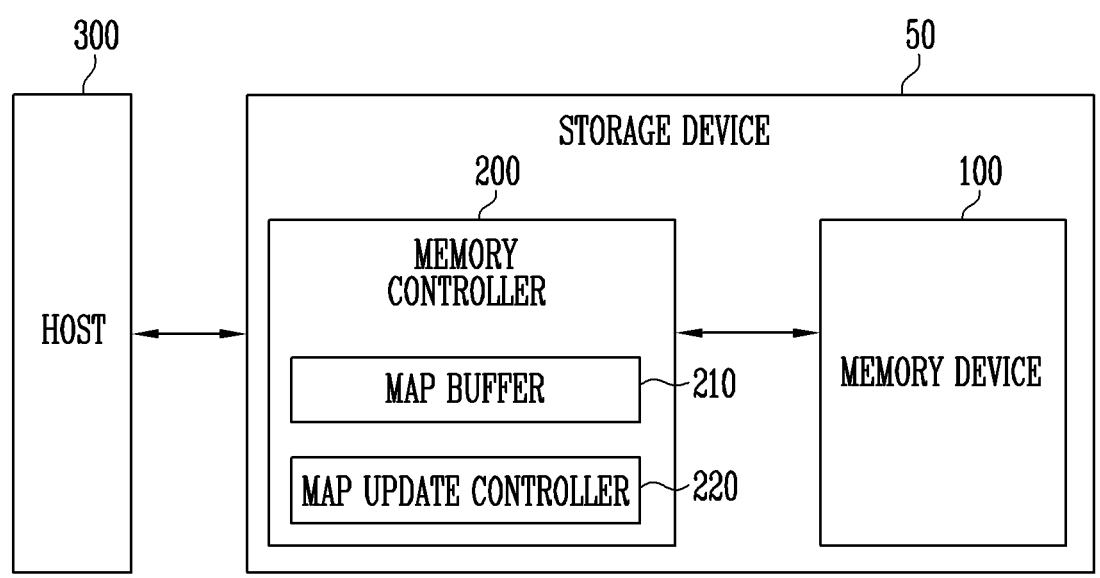
FIG. 1 illustrates an embodiment of a storage device.

FIG. 1 is a diagram illustrating a storage device 50 according to an embodiment. Referring to FIG. 1, the storage device 50 may include one or more memory devices 100 and a memory controller 200. The storage device 50 may store data under the control of a host 300, which, for example, may be a mobile phone, a smartphone, an MP3 player, a laptop computer, a desktop computer, a game console, a television (TV), a tablet personal computer (PC), or an in-vehicle infotainment system.

The storage device 50 may be manufactured as any one of various types of storage devices, which, for example, is compatible with a communication protocol or standard of a host interface communicating with the host 300. Examples of the storage device 50 include a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal storage bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms. Examples include package on package (POP), system in package (SIP), system on chip (SOC), multi-chip package (MCP), chip on board (COB), wafer-level fabricated package (WFP), and wafer-level stack package (WSP).

Each memory device 100 may store data under control of the memory controller 200. The memory device 100 may include a memory cell array including a plurality of memory cells which store data. The memory cells may be, for example, single-level cells (SLCs) capable of storing one data bit, multi-level cells (MLCs) capable of storing two data bits, triple-level cells (TLCs) capable of storing three data bits, or quad-level cells (QLCs) capable of storing four data bits.

The memory cell array may include a plurality of memory blocks, each of which may include a plurality of memory cells. One memory block may include a plurality of pages. In an embodiment, each page may be a unit by which data is stored (or written) in the memory device 100 or by which data stored in the memory device 100 is read.

A memory block may be a unit by which data is erased. In an embodiment, the memory device 100 may take many alternative forms. Examples include a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (SU-RAM). For illustrative purposes, one or more embodiments described herein will assume that memory device 100 is a NAND flash memory.

The memory device 100 may receive commands and addresses from the memory controller 200 and may access the areas of the memory cell array selected by the addresses. For example, the memory device 100 may perform an operation indicated by a command on an area selected by an address. In one embodiment, the memory device 100 may perform a write operation (e.g., program operation), a read operation, and an erase operation. During a program operation, the memory device 100 may program data to an area selected by an address. During a read operation, the memory device 100 may read data from an area selected by an address. During an erase operation, the memory device 100 may erase data stored in an area selected by an address.

The memory controller 200 controls the overall operation of the storage device 50. When power is applied to the storage device 50, the memory controller 200 may run firmware (FW) or other instructions. When the memory device 100 is a flash memory device, the memory controller 200 may run firmware (such as a flash translation layer (FTL)) for controlling communication between the host 300 and the memory device 100.

In an embodiment, the memory controller 200 may receive data and a logical block address (LBA) from the host 300 and may translate the logical block address into a physical block address (PBA), indicating the address of memory cells which are included in the memory device 100 and in which data is to be stored.

The memory controller 200 may control the memory device 100 so that a program operation, a read operation, or an erase operation is performed in response to a request received from the host 300. During a program operation, the memory controller 200 may provide a write command, a physical block address, and data to the memory device 100. During a read operation, the memory controller 200 may provide a read command and a physical block address to the memory device 100. During an erase operation, the memory controller 200 may provide an erase command and a physical block address to the memory device 100.

In an embodiment, the memory controller 200 may autonomously generate commands, addresses, and data regardless of requests from the host 300, and may transmit them to the memory device 100. For example, the memory controller 200 may provide commands, addresses, and data to the memory device 100 to perform background operations, such as a program operation for wear leveling and a program operation for garbage collection.

In an embodiment, the memory controller 200 may control at least two memory devices 100. In this case, the memory controller 200 may control the memory devices 100 depending on an interleaving scheme to improve operating performance. The interleaving scheme may be an operating manner in which the operating periods of the at least two memory devices 100 are caused to overlap each other.

In an embodiment, the memory controller 200 may include a map buffer 210 and a map update controller 220. The map buffer 210 may store metadata including history information indicating the history of changes in mapping data. The history information may indicate, for example, a change history of physical addresses mapped to logical addresses.

In an embodiment, the map buffer 210 may include storage areas respectively corresponding to one or more indices. Metadata corresponding to one logical address may be stored in a storage area corresponding to one index.

When mapping data for the logical address received from the host 300 is updated, the map update controller 220 may generate metadata based on the mapping data and may store the generated metadata in the map buffer 210. In one embodiment, the map update controller 220 may update metadata corresponding to logical addresses, stored in the map buffer 210, based on the mapping data. The map update controller 220 may flush the metadata, stored in the map buffer 210, into the memory device 100.

The metadata flushed into the memory device 100 may be stored in a memory block of the memory device 100. The metadata stored in the memory block may be used to recover the mapping data.

In an embodiment, the map update controller 220 may flush the metadata, stored in the map buffer 210, into the memory device 100 in response to a flush request received from the host 300. In an embodiment, the map update controller 220 may flush the metadata, stored in the map buffer 210, into the memory device 100 based on the amount of metadata stored in the map buffer 210. In an embodiment, when a sudden power-off occurs in the memory device 100, the map update controller 220 may flush the metadata, stored in the map buffer 210, into the memory device 100.

The host 300 may communicate with the storage device 50 using at least one of various communication methods. Examples include Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

Figure 2:
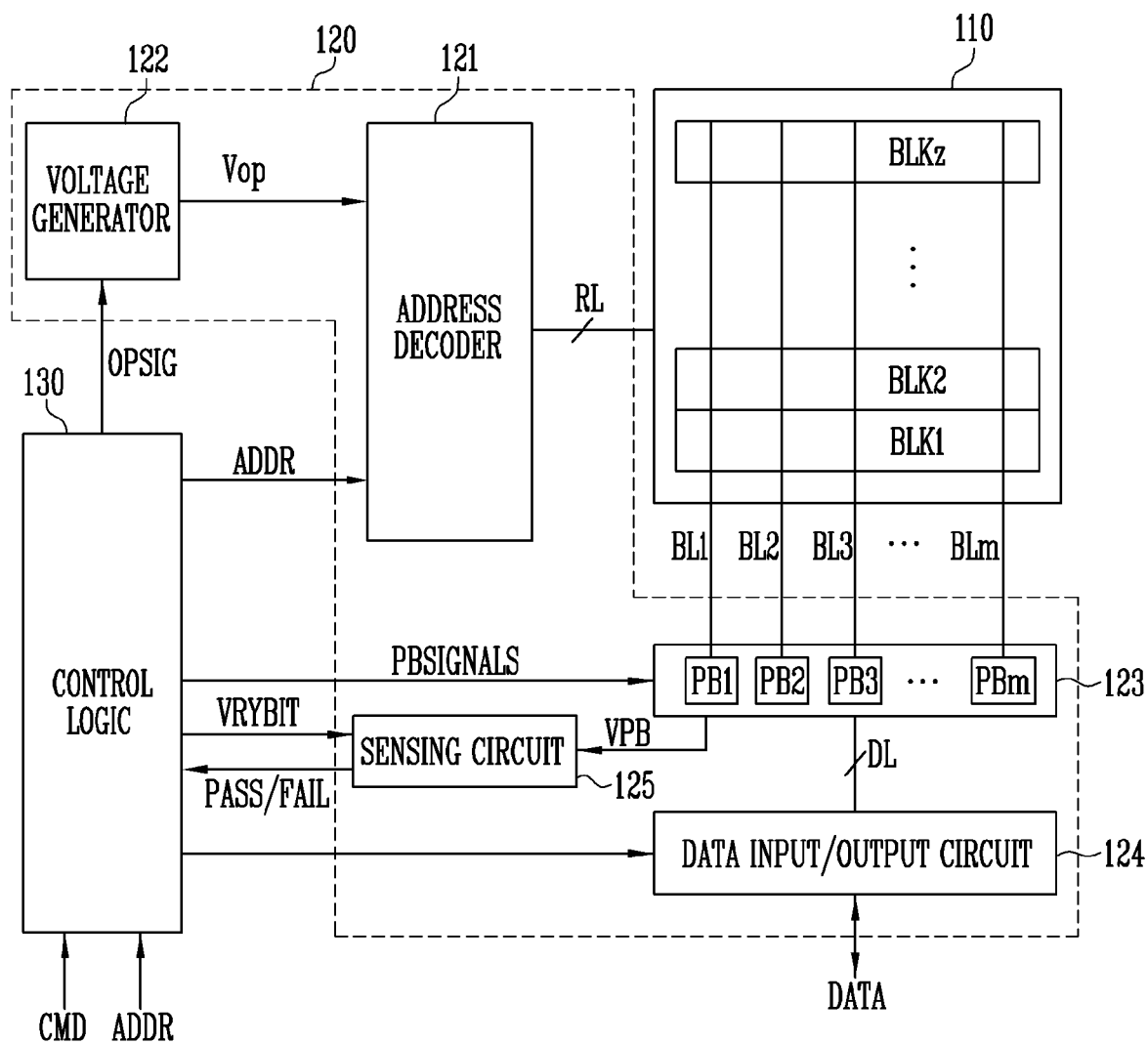
FIG. 2 illustrates an embodiment of a memory device.

FIG. 2 illustrates an embodiment of the memory device 100 which may include a memory cell array 110, a peripheral circuit 120, and a control logic 130.

The memory cell array 110 includes a plurality of memory blocks BLK1 to BLKz coupled to an address decoder 121 through row lines RL. The memory blocks BLK1 to BLKz are coupled to a read and write circuit 123 through bit lines BL1 to BLm. Each of the memory blocks BLK1 to BLKz may include a plurality of memory cells. In an embodiment, the plurality of memory cells may be nonvolatile memory cells. Memory cells coupled to the same word line, among the plurality of memory cells, may be defined as one physical page. For example, the memory cell array 110 may include a plurality of physical pages. In an embodiment, each of the memory blocks BLK1 to BLKz in the memory cell array 110 may include a plurality of dummy cells. For the dummy cells, one or more dummy cells may be coupled in series between a drain select transistor and one or more memory cells and between a source select transistor and one or more memory cells. Each of the memory cells of the memory device 100 may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits. In an embodiment, each of the memory cells of the memory device 100 may also be implemented as a type of cell capable of storing five or more data bits.

The peripheral circuit 120 may include the address decoder 121, a voltage generator 122, the read and write circuit 123, a data input/output circuit 124, and a sensing circuit 125. The peripheral circuit 120 may drive the memory cell array 110. For example, the peripheral circuit 120 may drive the memory cell array 110 in order to perform a program operation, a read operation, and an erase operation.

The address decoder 121 is coupled to the memory cell array 110 through the row lines RL. The row lines RL may include drain select lines, word lines, source selection lines, and a common source line. In accordance with an embodiment, the word lines may include normal word lines and dummy word lines. In accordance with an embodiment, the row lines RL may further include a pipe select line.

The address decoder 121 may be operated under control of the control logic 130 and may receive addresses ADDR from the control logic 130. The address decoder 121 may decode a block address among the received addresses ADDR. The address decoder 121 may select at least one of the memory blocks BLK1 to BLKz according to the decoded block address. The address decoder 121 may decode row addresses among the received addresses ADDR. The address decoder 121 may select at least one of word lines of the selected memory block according to the decoded row address. The address decoder 121 may apply operating voltages Vop supplied from the voltage generator 122 to the selected word line.

During a program operation, the address decoder 121 may apply a program voltage to the selected word line and apply a pass voltage having a level lower than that of the program voltage to unselected word lines. During a program verify operation, the address decoder 121 may apply a verify voltage to the selected word line and apply a verify pass voltage having a level higher than that of the verify voltage to the unselected word lines.

During a read operation, the address decoder 121 may apply a read voltage to the selected word line and apply a read pass voltage, having a level higher than that of the read voltage, to the unselected word lines.

In accordance with an embodiment, an erase operation of the memory device 100 is performed on a memory block basis. During an erase operation, the addresses ADDR input to the memory device 100 include a block address. The address decoder 121 may decode the block address and select at least one memory block according to the decoded block address. During the erase operation, the address decoder 121 may apply a ground voltage to word lines coupled to the selected memory block. In accordance with an embodiment, the address decoder 121 may decode column addresses among the received addresses ADDR. The decoded column address may be transferred to the read and write circuit 123. The address decoder 121 may include, for example, a row decoder, a column decoder, and an address buffer.

The voltage generator 122 may generate a plurality of operating voltages Vop using an external supply voltage that is supplied to the memory device 100. The voltage generator 122 may be operated under the control of the control logic 130. In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate the plurality of operating voltages Vop based on the external supply voltage or the internal supply voltage. The voltage generator 122 may generate various voltages for operation of the memory device 100. For example, the voltage generator 122 may generate a plurality of erase voltages, a plurality of program voltages, a plurality of pass voltages, a plurality of select read voltages, and a plurality of unselect read voltages.

The voltage generator 122 may include a plurality of pumping capacitors for receiving the internal supply voltage in order to generate a plurality of operating voltages Vop having various voltage levels. The voltage generator 122 may generate the plurality of operating voltages Vop by selectively enabling the plurality of pumping capacitors under the control of the control logic 130. The operating voltages Vop may be supplied to the memory cell array 110 by the address decoder 121.

The read and write circuit 123 includes first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm are operated under the control of the control logic 130. The first to m-th page buffers PB1 to PBm perform data communication with the data input/output circuit 124.

During a program operation, the first to m-th page buffers PB1 to PBm receive data DATA to be stored through the data input/output circuit 124 and data lines DL. Also, during a program operation, the first to m-th page buffers PB1 to PBm may transfer the data DATA to be stored, received through the data input/output circuit 124, to selected memory cells through the bit lines BL1 to BLm when a program voltage is applied to a selected word line. Memory cells in a selected page are programmed based on the received data DATA.

Memory cells coupled to a bit line to which a program permission voltage (e.g., a ground voltage) is applied may have increased threshold voltages. The threshold voltages of memory cells coupled to a bit line to which a program inhibit voltage (e.g., a supply voltage) is applied may be maintained. During a program verify operation, the first to m-th page buffers PB1 to PBm read the data DATA stored in the selected memory cells from the selected memory cells through the bit lines BL1 to BLm.

During a read operation, the read and write circuit 123 may read data DATA from the memory cells in the selected page through the bit lines BL and may store the read data DATA in the first to m-th page buffers PB1 to PBm.

During an erase operation, the read and write circuit 123 may allow the bit lines BL to float. In an embodiment, the read and write circuit 123 may include a column select circuit.

The data input/output circuit 124 is coupled to the first to m-th page buffers PB1 to PBm through the data lines DL. The data input/output circuit 124 is operated in response to control of the control logic 130.

The data input/output circuit 124 may include a plurality of input/output buffers which receive input data DATA. During a program operation, the data input/output circuit 124 receives the data DATA to be stored from an external controller. During a read operation, the data input/output circuit 124 outputs the data DATA (received from the first to m-th page buffers PB1 to PBm included in the read and write circuit 123) to the external controller.

During a read operation or a verify operation, the sensing circuit 125 may generate a reference current in response to an enable bit signal VRYBIT generated by the control logic 130. The sensing circuit 125 may also output a pass signal or a fail signal to the control logic 130, for example, by comparing a sensing voltage VPB received from the read and write circuit 123 with a reference voltage generated based on the reference current.

The control logic 130 may be coupled to the address decoder 121, the voltage generator 122, the read and write circuit 123, the data input/output circuit 124, and the sensing circuit 125. The control logic 130 may control the overall operation of the memory device 100. The control logic 130 may be operated in response to one or more commands CMD transmitted from an external device.

The control logic 130 may control the peripheral circuit 120 by generating various types of signals in response to commands CMD and addresses ADDR. For example, the control logic 130 may generate an operation signal OPSIG, addresses ADDR, read and write circuit control signals PBSIGNALS, and the enable bit VRYBIT in response to one or more commands CMD and addresses ADDR. The control logic 130 may output the operation signal OPSIG to the voltage generator 122, output the addresses ADDR to the address decoder 121, output the page buffer control signal PBSIGNALS to the read and write circuit 123, and output the enable bit VRYBIT to the sensing circuit 125. In addition, the control logic 130 may determine whether a verify operation has passed or failed in response to the pass or fail signal PASS or FAIL output from the sensing circuit 125.

Figure 3:
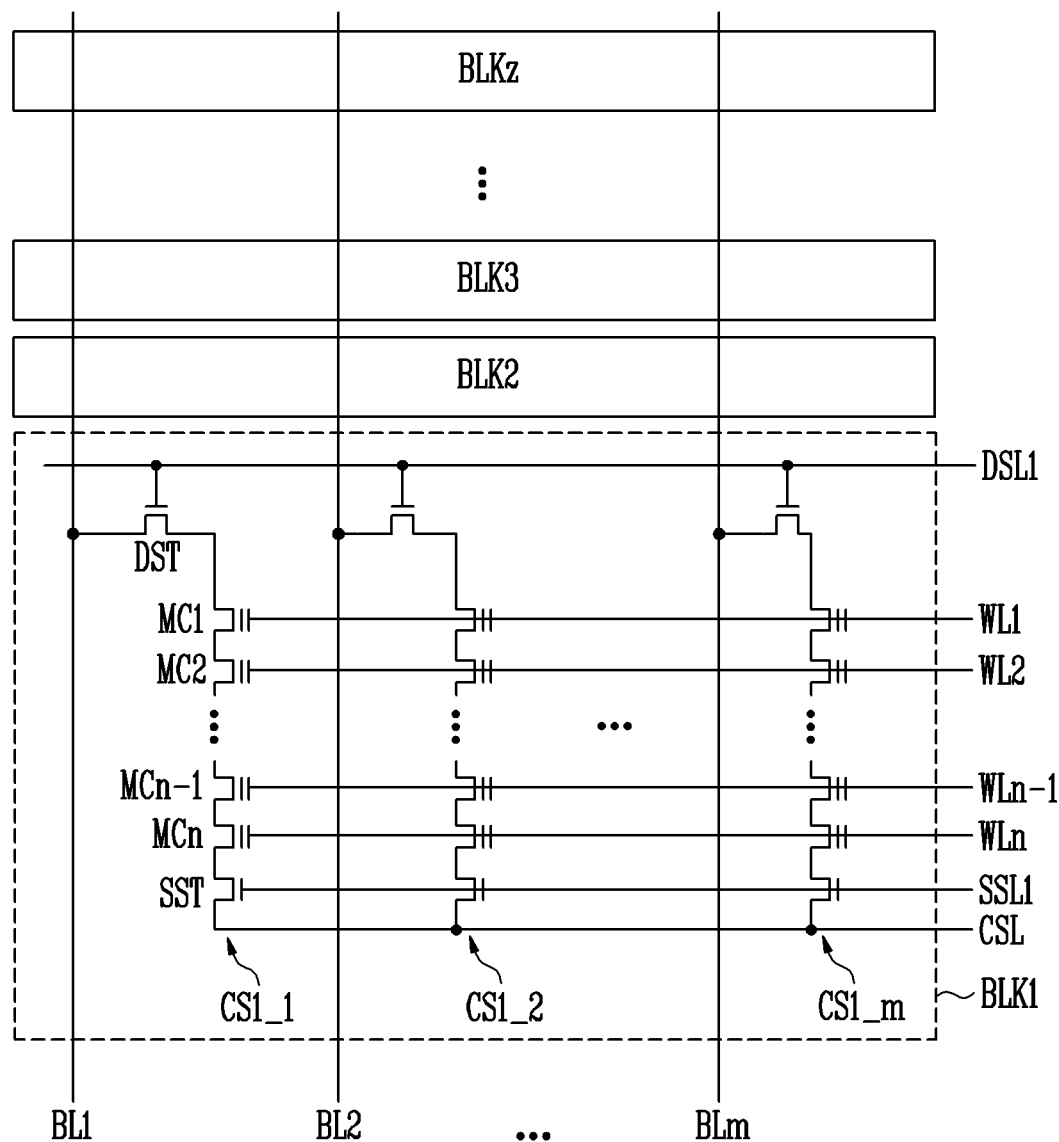
FIG. 3 illustrates an embodiment of a memory cell array.

FIG. 3 illustrates an embodiment of the memory cell array of FIG. 2. Referring to FIG. 3, the first to z-th memory blocks BLK1 to BLKz are coupled in common to the first to m-th bit lines BL1 to BLm. For convenience of description, elements included in the first memory block BLK1, among the plurality of memory blocks BLK1 to BLKz, are illustrated, and it is understood that elements in each of the remaining memory blocks BLK2 to BLKz may be similarly configured.

The memory block BLK1 may include a plurality of cell strings CS1_1 to CS1_$m$ (where m is a positive integer). The first to m-th cell strings CS1_1 to CS1_$m$ are respectively coupled to the first to m-th bit lines BL1 to BLm. Each of the first to m-th cell strings CS1_1 to CS1_$m$ may include a drain select transistor DST, a plurality of memory cells MC1 to MCn (where n is a positive integer) which are coupled in series to each other, and a source select transistor SST.

A gate terminal of the drain select transistor DST included in each of the first to m-th cell strings CS1_1 to CS1_$m$ is coupled to a drain select line DSL1. Gate terminals of the first to n-th memory cells MC1 to MCn included in each of the first to m-th cell strings CS1_1 to CS1_$m$ are coupled to first to n-th word lines WL1 to WLn, respectively. A gate terminal of the source select transistor SST included in each of the first to m-th cell strings CS1_1 to CS1_$m$ is coupled to a source select line SSL1.

For convenience of description, the structure of each cell string will be described based on the first cell string CS1_1, among the plurality of cell strings CS1_1 to CS1_$m$. However, it will be understood that each of the remaining cell strings CS1_2 to CS1_$m$ may be configured in the same manner as the first cell string CS1_1.

A drain terminal of the drain select transistor DST in the first cell string CS1_1 is coupled to the first bit line BL1. A source terminal of the drain select transistor DST in the first cell string CS1_1 is coupled to a drain terminal of the first memory cell MC1 in the first cell string CS1_1. The first to n-th memory cells MC1 to MCn may be coupled in series to each other. A drain terminal of the source select transistor SST in the first cell string CS1_1 is coupled to a source terminal of the n-th memory cell MCn in the first cell string CS1_1. A source terminal of the source select transistor SST in the first cell string CS1_1 is coupled to a common source line CSL. In an embodiment, the common source line CSL may be coupled in common to the first to z-th memory blocks BLK1 to BLKz.

The drain select line DSL1, the first to n-th word lines WL1 to WLn, and the source select line SSL1 are included in the row lines RL of FIG. 2. The drain select line DSL1, the first to n-th word lines WL1 to WLn, and the source select line SSL1 are controlled by the address decoder 121. The common source line CSL is controlled by the control logic 130. The first to m-th bit lines BL1 to BLm are controlled by the read and write circuit 123.

Figure 4:
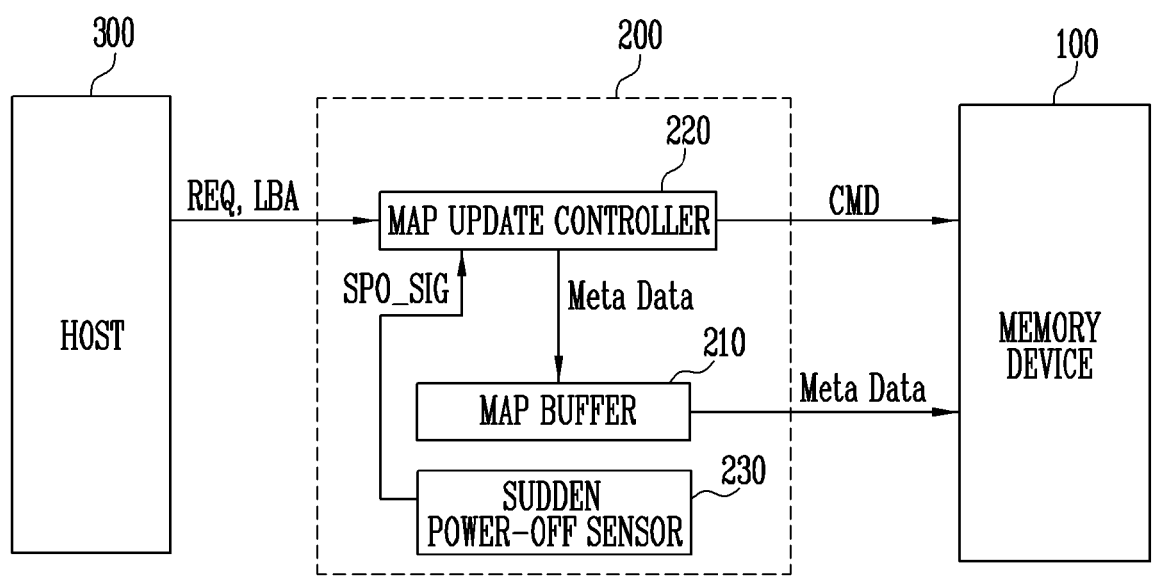
FIG. 4 illustrates an embodiment of a memory controller.

FIG. 4 illustrates an embodiment of the memory controller 200, which may include a map buffer 210 and a map update controller 220. The memory controller 200 may further include a sudden power-off sensor 230.

The map buffer 210 may store metadata including history information indicating the history of changes in mapping data. The history information may be the change history of a physical address mapped to a logical address. In an embodiment, the map buffer 210 may include storage areas respectively corresponding to one or more indices. Metadata corresponding to one logical address may be stored in a storage area corresponding to one index. When mapping data for a logical address (LBA) received from the host 300 is updated, the map update controller 220 may determine whether metadata corresponding to the logical address (LBA) is stored in the map buffer 210.

When it is determined that metadata corresponding to the logical address (LBA) is not stored in the map buffer 210, the map update controller 220 may generate metadata based on the updated mapping data and may store the generated metadata in the map buffer 210. For example, the map update controller 220 may store the generated metadata in a storage area corresponding to a target index, among storage areas of the map buffer 210. The map update controller 220 may validate the target index while storing the metadata in the storage area corresponding to the target index. When the metadata corresponding to the logical address (LBA) is stored in the map buffer 210, the map update controller 220 may update the metadata stored in the map buffer 210 based on the updated mapping data.

The map update controller 220 may flush the metadata, stored in the map buffer 210, into the memory device 100. The map update controller 220 may invalidate (nullify) the index of the storage area from which the metadata is flushed, among the storage areas of the map buffer 210. In an embodiment, the map update controller 220 may flush the metadata, stored in the map buffer 210, into the memory device 100 in response to a flush request REQ received from the host 300.

In an embodiment, the map update controller 220 may flush the metadata, stored in the map buffer 210, into the memory device 100 based on the amount of metadata stored in the map buffer 210. For example, the map update controller 220 may flush the metadata, stored in the map buffer 210, into the memory device 100 based on the number of valid indices, among indices respectively corresponding to the storage areas of the map buffer 210. When the number of valid indices reaches the set number of valid indices, the map update controller 220 may flush the metadata, stored in the map buffer 210, into the memory device 100. The set number of valid indices may be set as a default value. In an embodiment, the default value may be the total number of indices corresponding to the storage areas of the map buffer 210. The set number may be changed either in response to a request received from the host 300 or under the control of the memory controller 200.

In an embodiment, when a sensing signal SPO_SIG is received, the map update controller 220 may flush the metadata, stored in the map buffer 210, into the memory device 100.

The sudden power-off sensor 230 may sense a sudden power-off occurring in the memory device 100. When a sudden power-off is sensed, the sudden power-off sensor 230 may provide the sensing signal SPO_SIG to the map update controller 220. The sudden power-off may be a state in which power supplied to the memory device 100 is abnormally interrupted.

Figure 5:
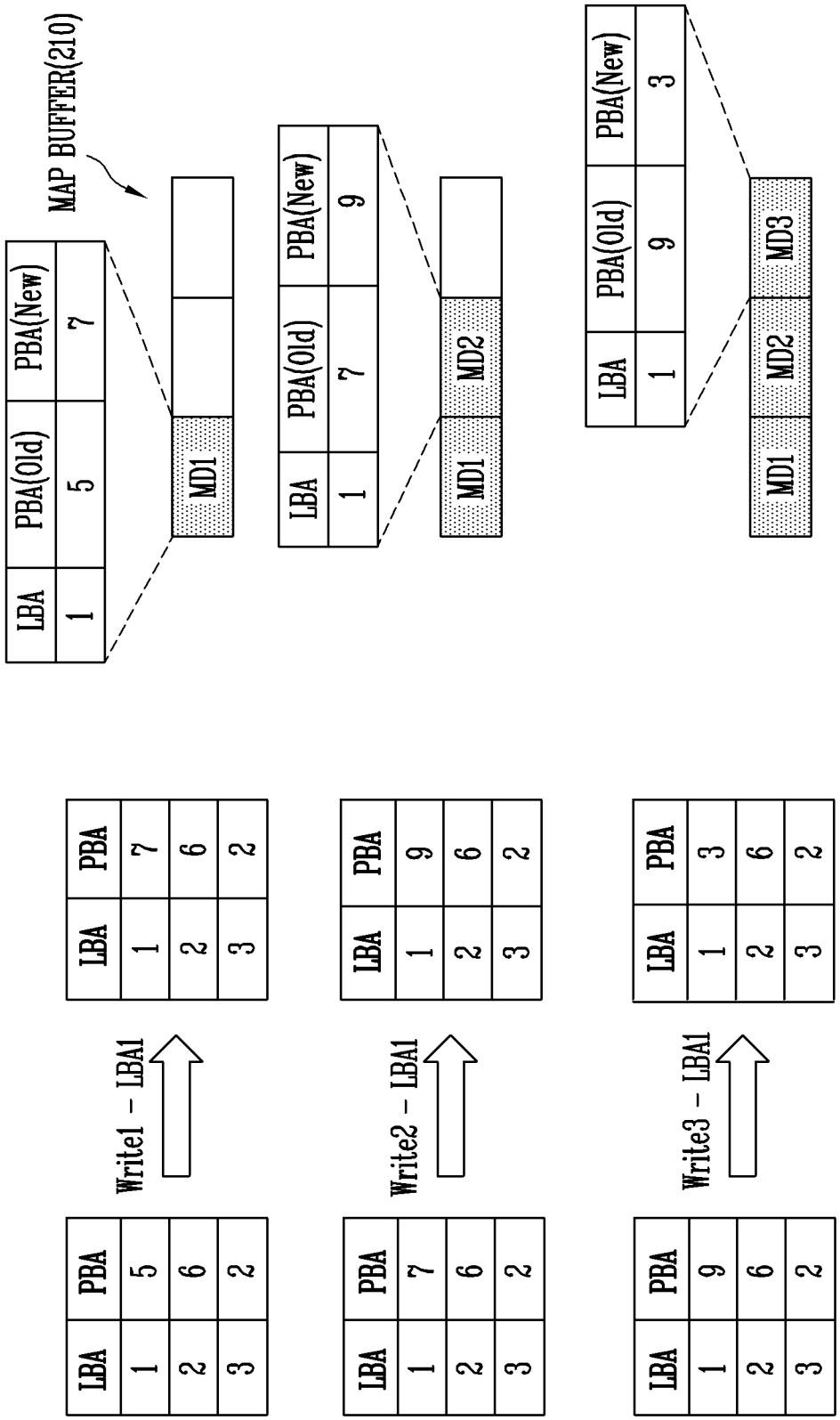
FIG. 5 illustrates an embodiment of a map buffer.

FIG. 5 illustrates an embodiment of the configuration and operation of the map buffer of FIG. 4. Referring to FIG. 5, whenever mapping data for a logical address is updated, metadata may be generated and stored in the map buffer 210. The metadata may include history information of a physical address mapped to a logical address. For example, the metadata may include the logical address, an old physical address previously mapped to the logical address, and a new physical address currently mapped to the logical address.

During a first write operation Write1, a physical address mapped to a logical address LBA1 may change from 'PBA5' to 'PBA7'. For example, when mapping data for the logical address LBA1 is updated, first metadata MD1 including history information of the physical address mapped to the logical address LBA1 may be stored in the map buffer 210. The first metadata MD1 may include the logical address LBA1, the old physical address PBA5, and the new physical address PBA7.

During a second write operation Write2, a physical address mapped to the logical address LBA1 may change from 'PBA7' to 'PBA9'. Second metadata MD2 including history information of the physical address mapped to the logical address LBA1 may be stored in the map buffer 210. The second metadata MD2 may include the logical address LBA1, the old physical address PBA7, and the new physical address PBA9.

During a third write operation Write3, a physical address mapped to the logical address LBA1 may change from 'PBA9' to 'PBA3'. Third metadata MD3 including history information of the physical address mapped to the logical address LBA1 may be stored in the map buffer 210. The third metadata MD3 may include the logical address LBA1, the old physical address PBA9, and the new physical address PBA3. When the map buffer 210 is full (i.e., fully filled) of metadata, the metadata stored in the map buffer 210 may be flushed into the memory device.

Figure 6:
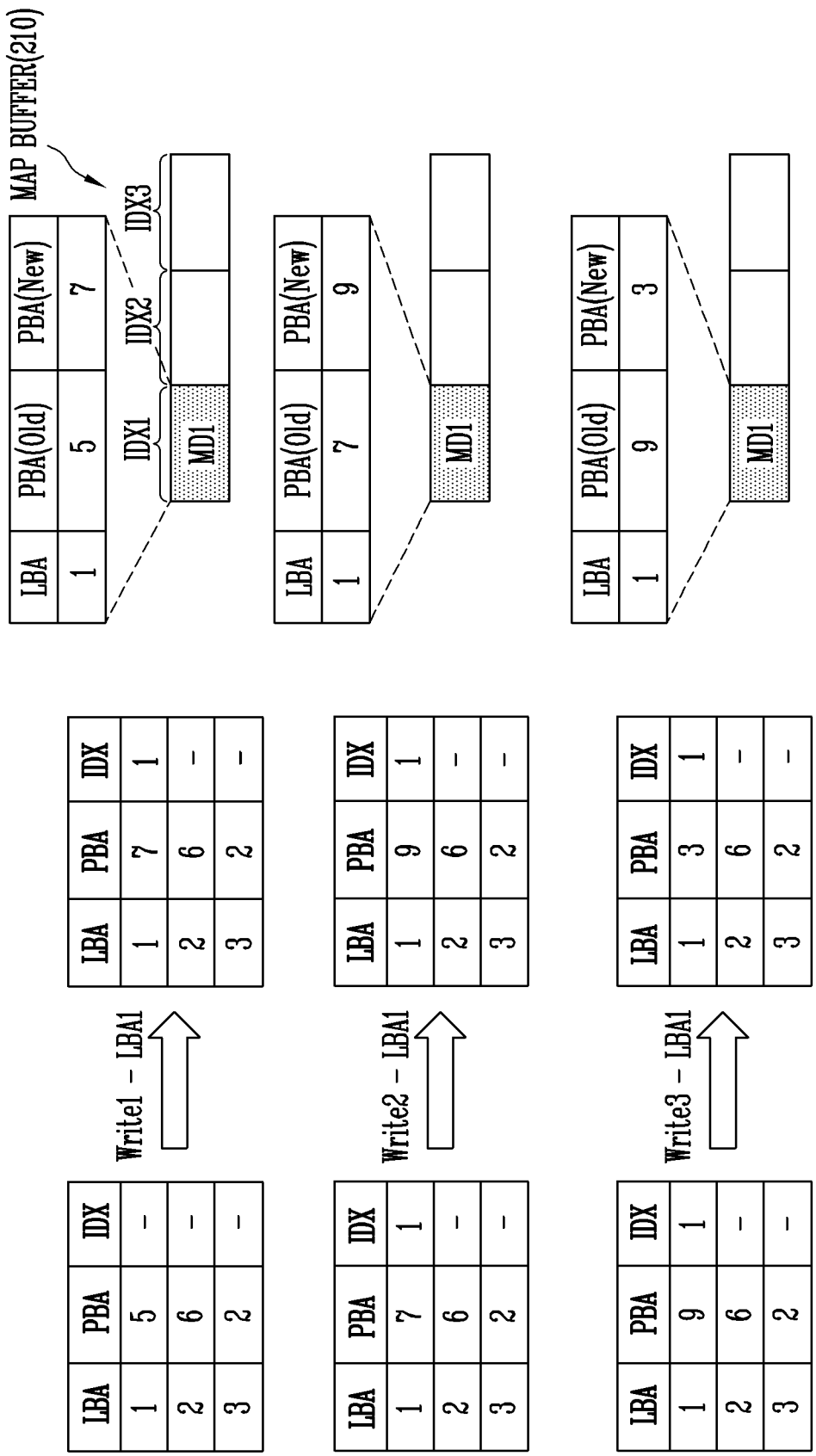
FIG. 6 illustrates an embodiment of a map buffer.

FIG. 6 illustrates another embodiment of the configuration and operation of the map buffer of FIG. 4. Referring to FIG. 6, the map buffer 210 may include storage areas corresponding to respective indices.

The metadata stored in the map buffer 210 may be managed depending on the indices. For example, an initial index may be invalid (–). When metadata is stored in a storage area corresponding to a target index, the target index may be validated. The value of the index may increase whenever metadata is stored in the map buffer 210. When the metadata stored in the map buffer 210 is flushed, the index of the flushed storage area may be invalidated.

In an embodiment, when mapping data for a logical address is updated, metadata may be generated based on the updated mapping data. The generated mapping data may be stored in a storage area corresponding to the target index, among storage areas of the map buffer 210. In an embodiment, when the mapping data for the logical address is updated, in a state in which the metadata corresponding to the logical address is stored in the storage area corresponding to the target index, the metadata stored in the storage area corresponding to the target index may be updated.

In FIG. 6, the map buffer 210 may include storage areas corresponding to first to third indices IDX1 to IDX3. Initially, the first to third indices IDX1 to IDX3 may be invalid (–). A different number of indices corresponding to the storage areas of the map buffer 210 may be used in another embodiment.

During a first write operation Write1, a physical address mapped to a logical address LBA1 may change from 'PBA5' to 'PBA7'. When mapping data for the logical address LBA1 is updated, first metadata MD1 including history information of the physical address mapped to the logical address LBA1 may be stored in the map buffer 210. The first metadata MD1 may be stored in a storage area corresponding to the first index IDX1, among the storage areas of the map buffer 210, and the first index IDX1 may be validated. The first metadata MD1 may include the logical address LBA1, the old physical address PBA5, and the new physical address PBA7.

During a second write operation Write2, a physical address mapped to the logical address LBA1 may change from 'PBA7' to 'PBA9'. When the mapping data for the logical address LBA1 is updated, the first metadata MD1 (stored in the storage area corresponding to the first index IDX1) may be updated based on the updated mapping data. The updated first metadata MD1 may include the logical address LBA1, the old physical address PBA7, and the new physical address PBA9.

During a third write operation Write3, a physical address mapped to the logical address LBA1 may change from 'PBA9' to 'PBA3'. When the mapping data for the logical address LBA1 is updated, the first metadata MD1 (stored in the storage area corresponding to the first index IDX1) may be updated based on the updated mapping data. The updated first metadata MD1 may include the logical address LBA1, the old physical address PBA9, and the new physical address PBA3.

In accordance with the embodiment of FIG. 6, even when the mapping data for the same logical address is updated several times, only the latest metadata corresponding to the logical address is stored in the map buffer 210. Thus, the capacity of the map buffer 210 may be efficiently utilized. Also, since the frequency with which metadata is flushed into the memory device is reduced, map update performance may be improved.

Figure 7A:
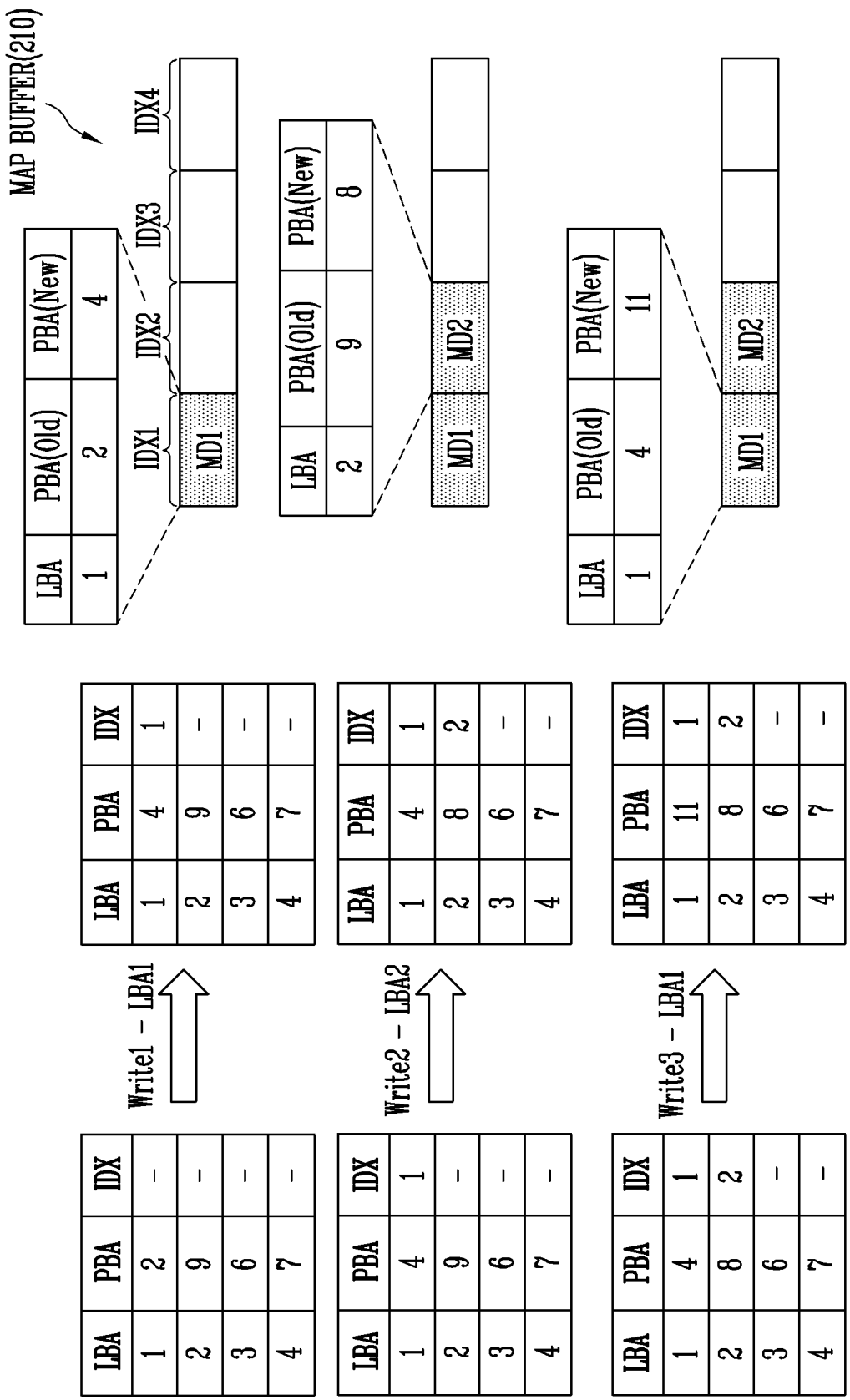
Figure 7B:
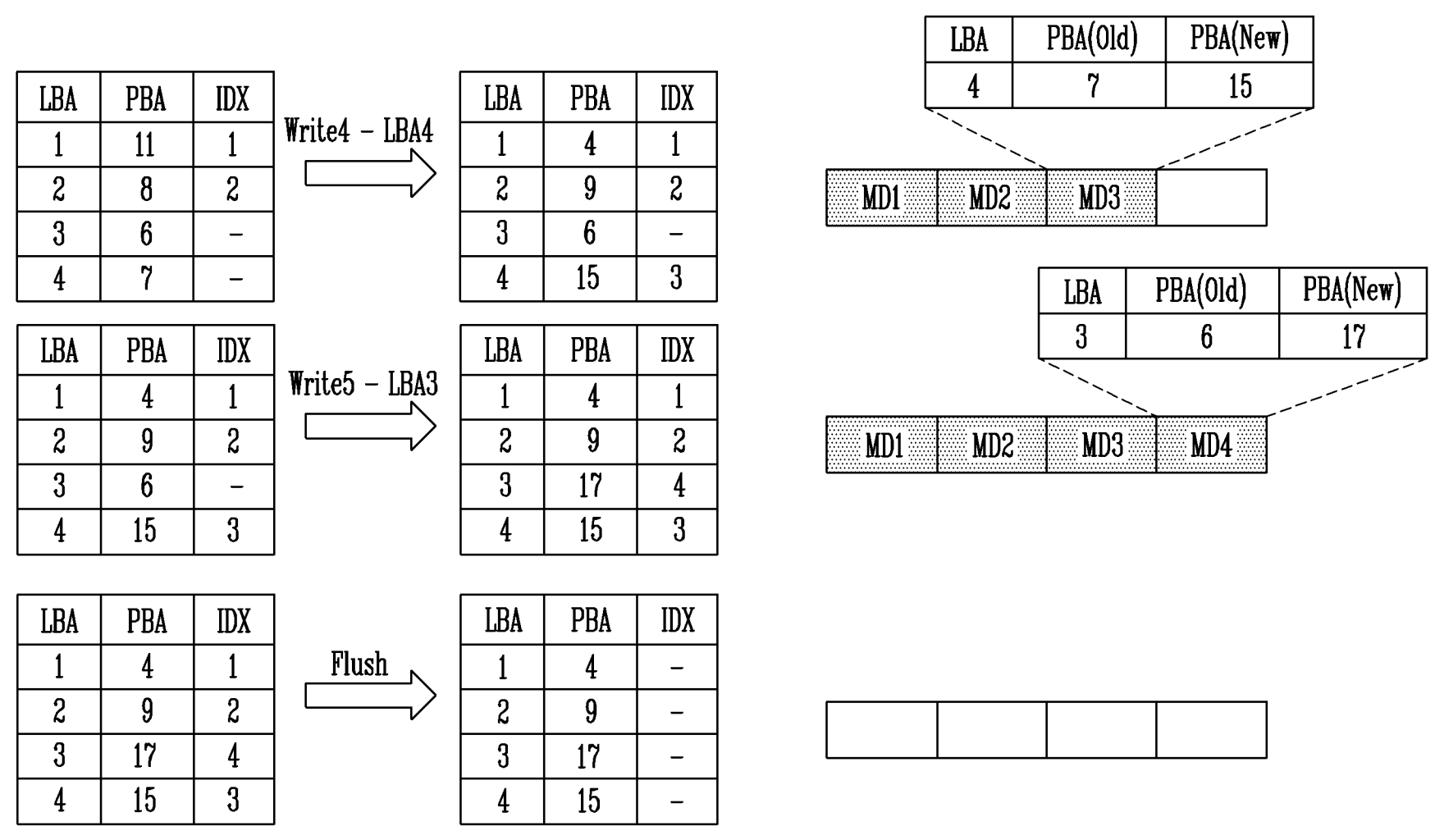

FIGS. 7A and 7B illustrate embodiments of a map update operation.

FIG. 7A corresponds to an embodiment where the map update operation is performed based on first to third write operations Write1 to Write3. The map buffer 210 may include storage areas corresponding to first to fourth indices IDX1 to IDX4. Initially, the first to fourth indices IDX1 to IDX4 may be invalid (–). The number of indices corresponding to the storage areas of the map buffer 210 is not limited to the present embodiment. In an embodiment, the target index of the storage area in which metadata is stored may sequentially increase whenever the metadata is stored in the map buffer 210.

During the first write operation Write1, a physical address mapped to a first logical address LBA1 may change from 'PBA2' to 'PBA4'. When mapping data for the first logical address LBA1 is updated, first metadata MD1 including history information of the physical address mapped to the first logical address LBA1 may be stored in the map buffer 210. The first metadata MD1 may be stored in a storage area corresponding to the first index IDX1, among the storage areas of the map buffer 210, and the first index IDX1 may be validated. The first metadata MD1 may include the first logical address LBA1, the old physical address PBA2, and the new physical address PBA4.

During the second write operation Write2, a physical address mapped to a second logical address LBA2 may change from 'PBA9' to 'PBA8'. When mapping data for the second logical address LBA2 is updated, second metadata MD2 including history information of the physical address mapped to the second logical address LBA2 may be stored in the map buffer 210. The second metadata MD2 may be stored in a storage area corresponding to the second index IDX2, among the storage areas of the map buffer 210, and the second index IDX2 may be validated. The second metadata MD2 may include the second logical address LBA2, the old physical address PBA9, and the new physical address PBA8.

During the third write operation Write3, a physical address mapped to the first logical address LBA1 may change from 'PBA4' to 'PBA11'. When the mapping data for the first logical address LBA1 is updated, the first metadata MD1 stored in the storage area corresponding to the first index IDX1 may be updated. The updated first metadata MD1 may include the first logical address LBA1, the old physical address PBA4, and the new physical address PBA11.

FIG. 7B corresponds to an embodiment where the map update operation is performed based on fourth and fifth write operations Write4 and Write5 and a flush operation is performed.

During the fourth write operation Write4, a physical address mapped to the fourth logical address LBA4 may change from 'PBA7' to 'PBA15'. When mapping data for the fourth logical address LBA4 is updated, third metadata MD3 including history information of the physical address mapped to the fourth logical address LBA4 may be stored in the map buffer 210. The third metadata MD3 may be stored in a storage area corresponding to the third index IDX3, among the storage areas of the map buffer 210, and the third index IDX3 may be validated. The third metadata MD3 may include the fourth logical address LBA4, the old physical address PBA7, and the new physical address PBA15.

During the fifth write operation Write5, a physical address mapped to the third logical address LBA3 may change from 'PBA6' to 'PBA17'. When mapping data for the third logical address LBA3 is updated, fourth metadata MD4 including history information of the physical address mapped to the third logical address LBA3 may be stored in the map buffer 210. The fourth metadata MD4 may be stored in a storage area corresponding to the fourth index IDX4, among the storage areas of the map buffer 210, and the fourth index IDX4 may be validated. The fourth metadata MD4 may include the third logical address LBA3, the old physical address PBA6, and the new physical address PBA17.

There may be various conditions on which the metadata stored in the map buffer 210 is flushed into the memory device. In an embodiment, the flush operation may be performed depending on the amount of metadata stored in the map buffer 210. For example, the flush operation may be performed when the map buffer 210 is full (i.e., fully filled) of metadata. In one embodiment, the flush operation may be performed when the amount of metadata stored in the map buffer 210 reaches a set value. In one embodiment, the flush operation may be performed when the number of valid indices, among indices corresponding to the map buffer 210, reaches the set number of valid indices. In an embodiment, the flush operation may be performed in response to a flush request received from a host. In an embodiment, the flush operation may be performed when a sudden power-off occurring in the memory device is sensed. In FIGS. 7A and 7B, the number of valid indices that are set as one of the flush conditions may be 4. However, a different number of valid indices may be present as one of the flush conditions in another embodiment.

After the fifth write operation Write5, the first to fourth indices IDX1 to IDX4 may be valid. For example, the flush operation may be performed since the number of valid indices has reached the set number of valid indices. The first to fourth metadata MD1 to MD4 stored in respective storage areas corresponding to the first to fourth indices IDX1 to IDX4 may be flushed into the memory device. The indices of storage areas in which the flushed metadata were stored may be invalidated (–). Therefore, the first to fourth indices IDX1 to IDX4 may be invalidated (–).

FIG. 8 is a flowchart illustrating a map update operation according to an embodiment. Referring to FIG. 8, at operation S801, mapping data for a logical address received from a host may be updated. At operation S803, metadata corresponding to the logical address may be generated. The metadata may include history information of a physical address mapped to the logical address. For example, the metadata may include a change history of the physical address mapped to the logical address.

At operation S805, whether previous metadata corresponding to the logical address is stored in a map buffer may be determined. When it is determined that previous metadata is stored in the map buffer (e.g., in case of Yes), the process may proceed to operation S809. When it is determined that previous metadata is not stored in the map buffer (e.g., in case of No), the process may proceed to operation S807. At operation S807, the generated metadata may be stored in the map buffer. At operation S809, the previous metadata stored in the map buffer may be updated based on the updated mapping data. In one embodiment, the previous metadata stored in the map buffer may be updated based on the generated metadata.

FIG. 9 is a flowchart illustrating a map update operation according to an embodiment. At operation S901, metadata corresponding to a logical address may be stored in a map buffer. For example, the metadata corresponding to the logical address may be stored in a storage area corresponding to a target index, among storage areas of the map buffer.

At operation S903, whether mapping data for the logical address has been updated may be determined. When it is determined that the mapping data has been updated (e.g., in case of Yes), the process may proceed to operation S905. When it is determined that the mapping data has not been updated (e.g., in case of No), the process may be terminated. At operation S905, the metadata stored in the map buffer may be updated based on the updated mapping data.

Figure 10:
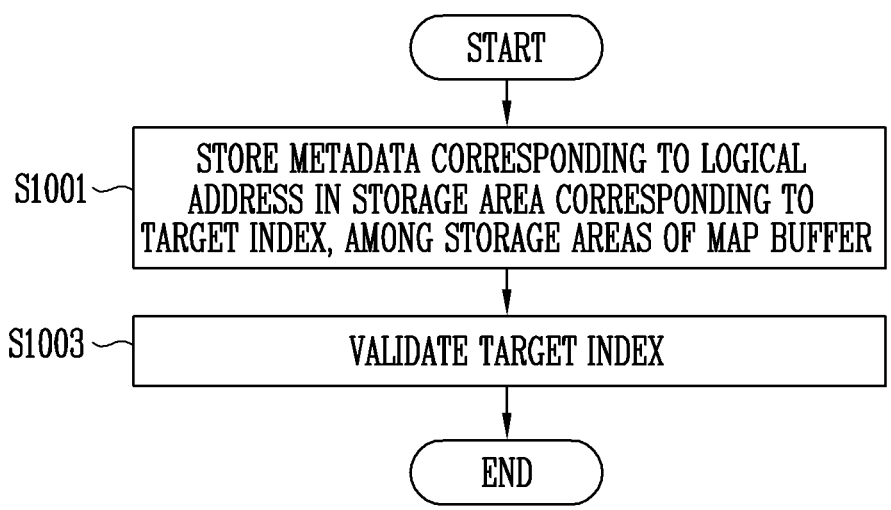
FIG. 10 illustrates an embodiment of an index validation operation.

FIG. 10 is a flowchart illustrating an index validation operation according to an embodiment. Referring to FIG. 10, at operation S1001, metadata corresponding to a logical address may be stored in a storage area corresponding to a target index, among storage areas of a map buffer. At operation S1003, the target index may be validated.

Figure 11:
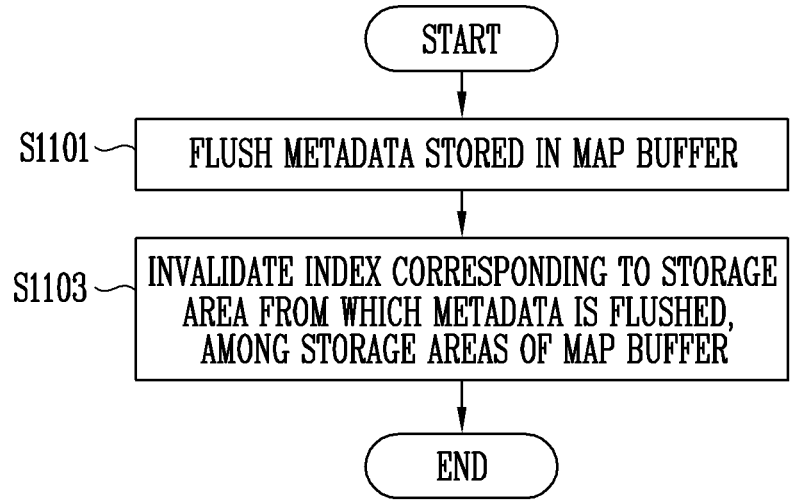
FIG. 11 illustrates an embodiment of an index invalidation operation.

FIG. 11 is a flowchart illustrating an index invalidation operation according to an embodiment. Referring to FIG. 11, at operation S1101, metadata stored in a map buffer may be flushed into a memory device. At operation S1103, an index corresponding to the storage area from which the metadata is flushed (among storage areas of the map buffer) may be invalidated.

Figure 12:
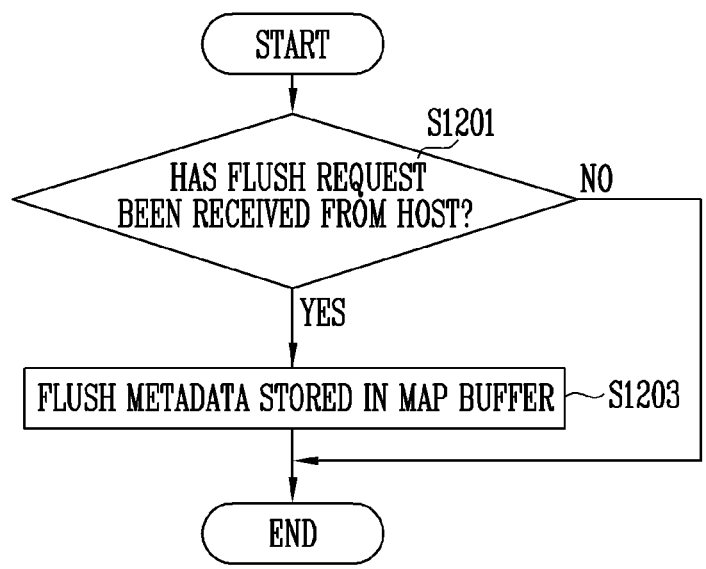
FIG. 12 illustrates an embodiment of a map flush operation.

FIG. 12 is a flowchart illustrating a map flush operation according to an embodiment. Referring to FIG. 12, at operation S1201, a memory controller may determine whether a flush request has been received from a host. When it is determined that the flush request has been received (e.g., in case of Yes), the process may proceed to operation S1203. When it is determined that a flush request has not been received (e.g., in case of No), the process may be terminated. At operation S1203, metadata stored in a map buffer may be flushed into a memory device.

Figure 13:
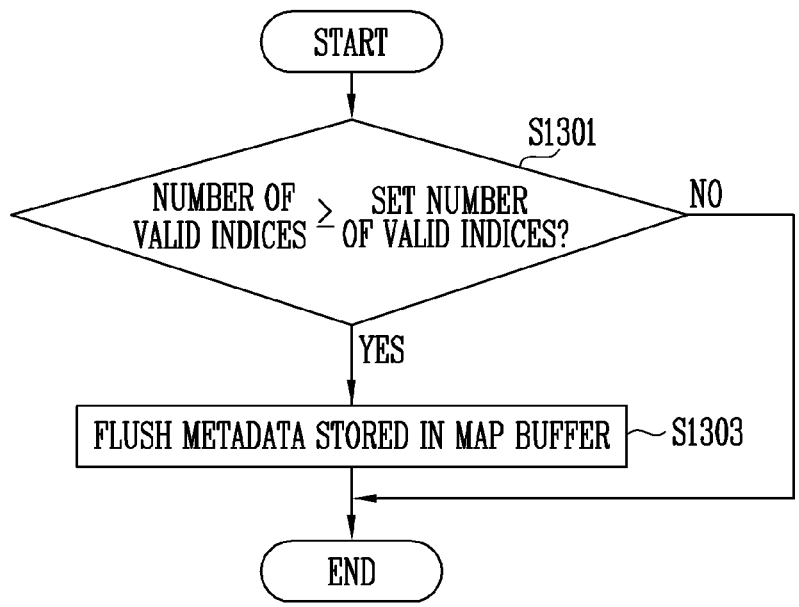
FIG. 13 illustrates an embodiment of a map flush operation.

FIG. 13 is a flowchart illustrating a map flush operation according to an embodiment. Referring to FIG. 13, at operation S1301, whether the number of valid indices is equal to or greater than the set number of valid indices may be determined. When it is determined that the number of valid indices is equal to or greater than the set number of valid indices (e.g., in case of Yes), the process may proceed to operation S1303. When it is determined that the number of valid indices is less than the preset number of valid indices (e.g., in case of No), the process may be terminated. The set number may be set to various values depending, for example, on the operating environment of a memory controller. In an embodiment, the set number may be the total number of indices corresponding to the storage areas of a map buffer. In an embodiment, the set number may be a number corresponding to a predetermined proportion of the total number of indices corresponding to the storage areas of the map buffer. At operation S1303, metadata stored in the map buffer may be flushed into a memory device.

Figure 14:
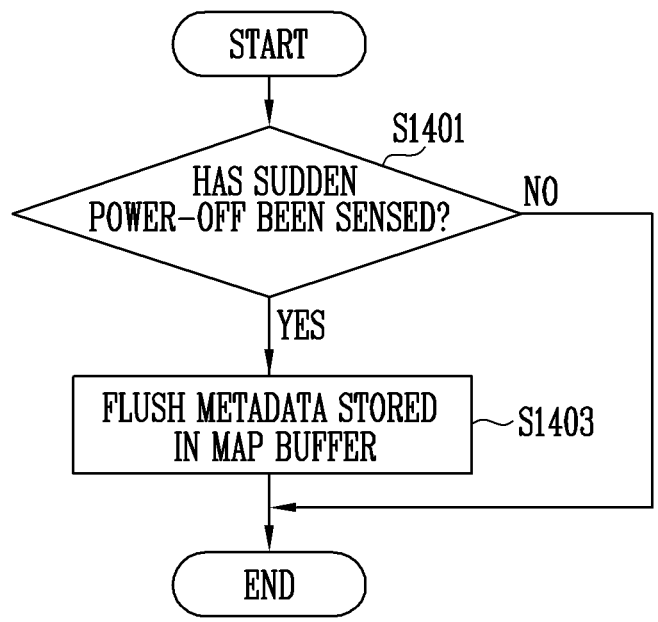
FIG. 14 illustrates an embodiment of a map flush operation.

FIG. 14 is a flowchart illustrating a map flush operation according to an embodiment. Referring to FIG. 14, at operation S1401, whether a sudden power-off has been sensed may be determined. When it is determined that the sudden power-off has been sensed (e.g., in case of Yes), the process may proceed to operation S1403. When it is determined that a sudden power-off has not been sensed (e.g., in case of No), the process may be terminated. At operation S1403, metadata stored in a map buffer may be flushed into a memory device.

Figure 15:
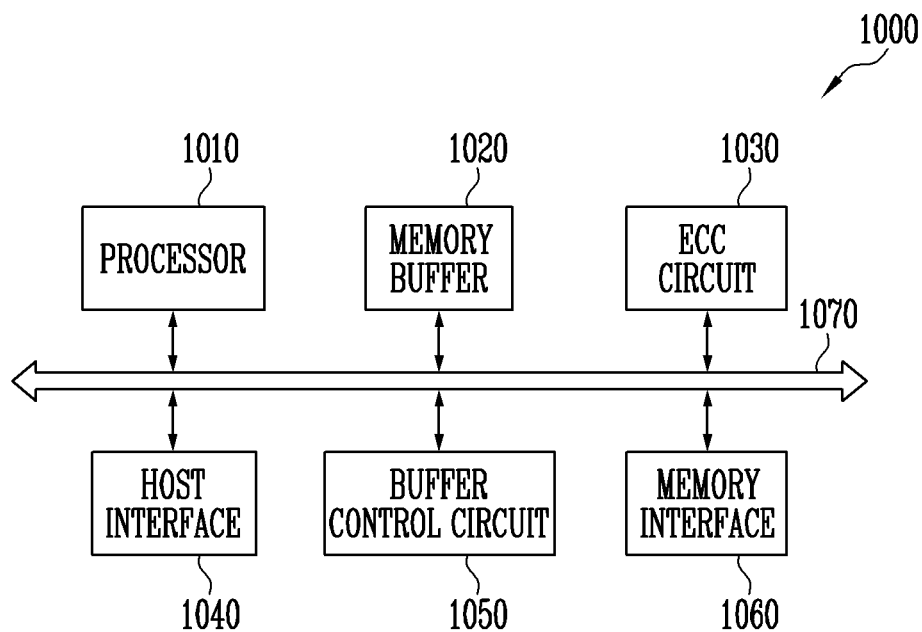
FIG. 15 illustrates an embodiment of a memory controller.

FIG. 15 is a diagram illustrating an embodiment of the memory controller of FIG. 1. Referring to FIG. 15, a memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware or other instructions for controlling the memory device.

The memory controller 1000 may include a processor 1010, a memory buffer 1020, an error correction circuit (Error Correcting Code: ECC circuit) 1030, a host interface 1040, a buffer control circuit 1050, a memory interface 1060, and a bus 1070. The bus 1070 may provide channels between components of the memory controller 1000.

The processor 1010 may control the overall operation of the memory controller 1000 and may perform logical operations. The processor 1010 may communicate with an external host through the host interface 1040 and also may communicate with the memory device through the memory interface 1060. Further, the processor 1010 may communicate with the memory buffer 1020 through the buffer control circuit 1050. The processor 1010 may control operation of the storage device using the memory buffer 1020 as a working memory, a cache memory, or a buffer memory.

The processor 1010 may perform the function of a flash translation layer (FTL). The processor 1010 may translate a logical block address (LBA), provided by the host, into a physical block address (PBA) through the FTL. The FTL may receive the LBA using a mapping table and translate the LBA into the PBA. Examples of an address mapping method performed through the FTL may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may derandomize data received from the memory device during a read operation. For example, the processor 1010 may derandomize the data received from the memory device using a derandomizing seed. The derandomized data may be output to the host. In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The ECC circuit 1030 may perform error correction. For example, the ECC circuit 1030 may perform error correcting code (ECC) encoding based on data to be written to the memory device through the memory interface 1060. The ECC-encoded data may be transferred to the memory device through the memory interface 1060. The ECC circuit 1030 may perform ECC decoding based on data received from the memory device through the memory interface 1060. In an example, the ECC circuit 1030 may be included as the component of the memory interface 1060 in the memory interface 1060.

The host interface 1040 may communicate with the external host under the control of the processor 1010. The host interface 1040 may perform communication using at least one of various communication methods. Examples include Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 may not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information (such as commands or addresses) in the memory controller 1000. The data bus and the control bus may be isolated from each other and may neither interfere with each other nor influence each other. The data bus may be coupled to the host interface 1040, the buffer control circuit 1050, the ECC circuit 1030, and the memory interface 1060. The control bus may be coupled to the host interface 1040, the processor 1010, the buffer control circuit 1050, the memory buffer 1020, and the memory interface 1060.

In an embodiment, the processor 1010 may include a map update controller 220 illustrated in FIG. 1. The memory buffer 1020 may include a map buffer 210 illustrated in FIG. 1.

Figure 16:
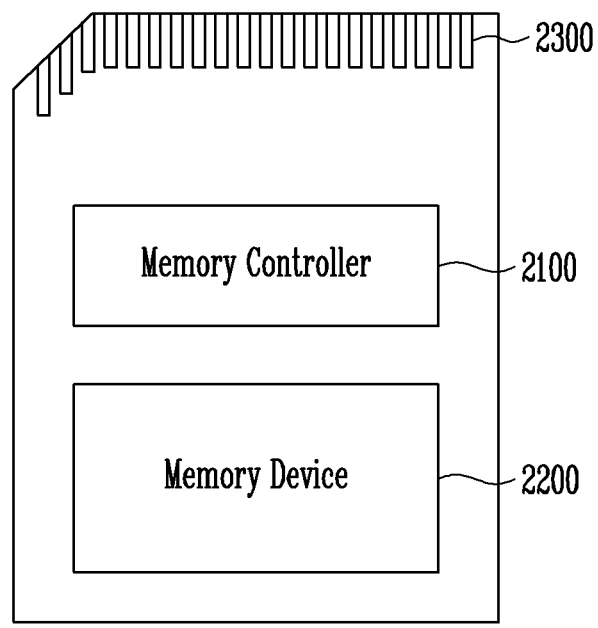
FIG. 16 illustrates an embodiment of a memory card system.

FIG. 16 is a block diagram illustrating an embodiment of a memory card system to which a storage device as described herein may be applied. Referring to FIG. 16, a memory card system 2000 may include a memory controller 2100, a memory device 2200, and a connector 2300.

The memory controller 2100 is coupled to and may access the memory device 2200, and may control read, write, erase, and background operations of the memory device 2200. The memory controller 2100 may provide an interface between the memory device 2200 and a host. The memory controller 2100 may run firmware or other instructions for controlling the memory device 2200. The memory controller 2100 may be implemented, for example, in the same way as the memory controller 200 described above with reference to FIG. 1. In an embodiment, the memory controller 2100 may include one or more additional components, including but not limited to a RAM, a processor, a host interface, a memory interface, and/or an ECC circuit.

The memory controller 2100 may communicate with an external device (e.g., a host) through the connector 2300 based on a specific communication protocol. Examples of the communication protocol include universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined based on at least one of the above-described communication protocols.

In an embodiment, the memory device 2200 may be implemented as any of various nonvolatile memory devices. Examples include an Electrically Erasable and Programmable ROM (EEPROM), a NAND flash memory, a NOR flash memory, a Phase-change RAM (PRAM), a Resistive RAM (ReRAM), a Ferroelectric RAM (FRAM), a Spin-Torque Magnetic RAM (STT-MRAM).

The memory controller 2100 and the memory device 2200 may be integrated into a single semiconductor device to configure a memory card. Examples include a PC card (personal computer memory card international association: PCMCIA), a compact flash card (CF), a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 17:
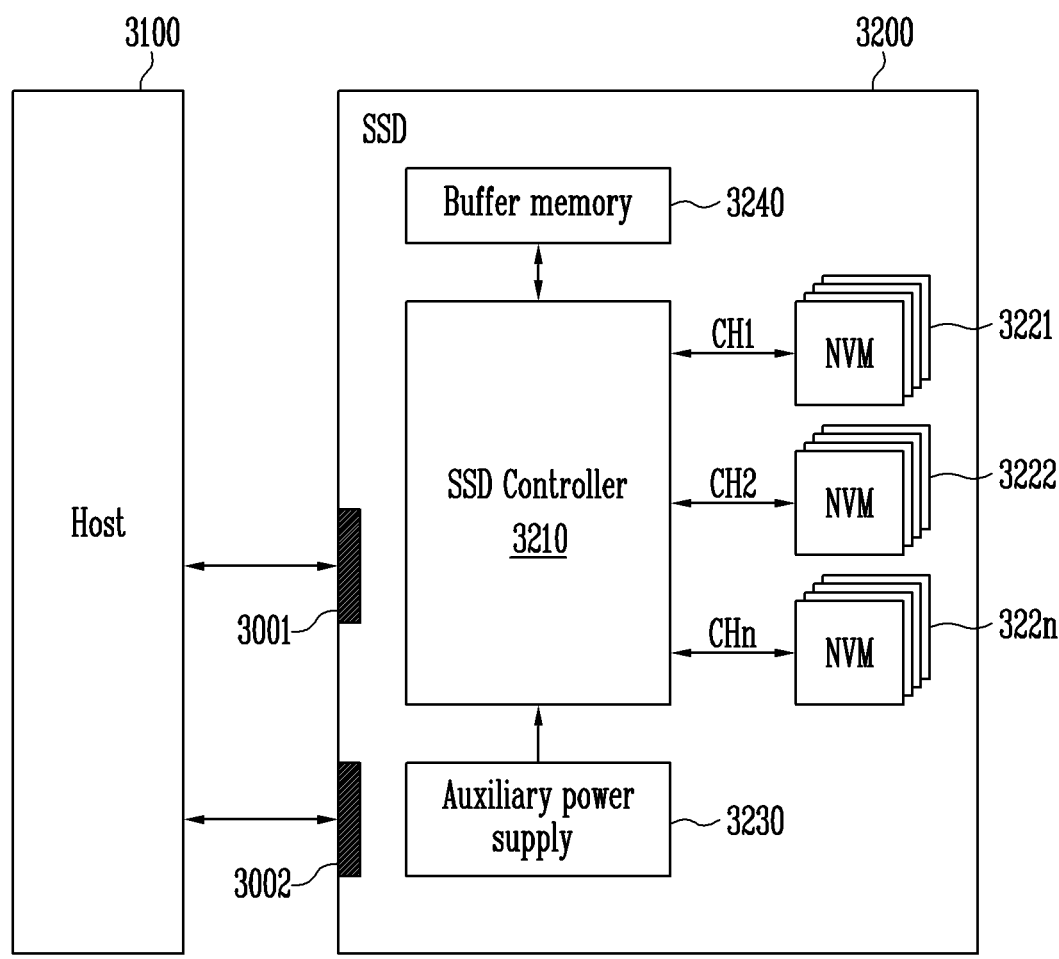
FIG. 17 illustrates an embodiment of a solid state drive.

FIG. 17 is a block diagram illustrating an embodiment of a solid state drive (SSD) system 3000 to which a storage device as described herein may be applied.

Referring to FIG. 17, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In accordance with an embodiment, the SSD controller 3210 may perform the function of the memory controller 200 described above with reference to FIG. 1. The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322$n$ or may temporarily store metadata (e.g., mapping tables) of the flash memories 3221 to 322$n$. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 18:
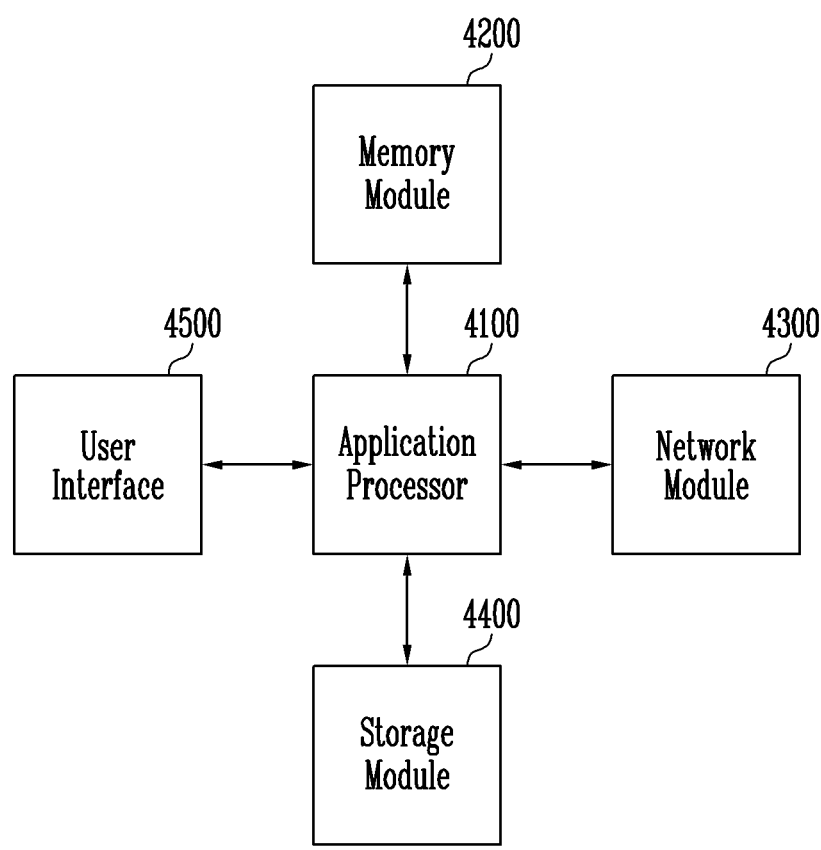
FIG. 18 illustrates an embodiment of a user system.

FIG. 18 is a block diagram illustrating an embodiment of a user system 4000 to which a storage device as described herein may be applied. Referring to FIG. 18, a user system 4000 may include an application processor 4100, a memory module 4200, a network module 4300, a storage module 4400, and a user interface 4500.

The application processor 4100 may control components in the user system 4000 based on execution of various instructions of an Operating System (OS) and/or corresponding to one or more user programs. In an embodiment, the application processor 4100 may include controllers, interfaces, graphic engines, etc., for controlling the components in the user system 4000. In one embodiment, the application processor 4100 may be provided as a system-on-chip (SoC).

The memory module 4200 may serve as a main memory, a working memory, a buffer memory or a cache memory of the user system 4000. Examples of the memory module 4200 include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package (POP) and may then be provided as a single semiconductor package.

The network module 4300 may communicate with external devices and may support one or more forms of wireless communication. Examples include Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. In one embodiment, the storage module 4400 may transmit the data stored in the storage module 4400 to the application processor 4100. In an embodiment, the storage module 4400 may be implemented as a nonvolatile semiconductor memory device. Examples include a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (e.g., removable drive) such as a memory card or an external drive of the user system 4000.

In an embodiment, the storage module 4400 may include a plurality of nonvolatile memory devices, each of which may be operated in the same way as the memory device 100 described above with reference to FIG. 1. The storage module 4400 may be operated in the same way as the storage device 50 described above with reference to FIG. 1.

The user interface 4500 may include interfaces which, for example, may input data or instructions to the application processor 4100 or output data to an external device. In an embodiment, the user interface 4500 may include one or more user input interfaces. Examples include a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces. Examples include a Liquid Crystal Display (LCD), an Organic Light Emitting Diode (OLED) display device, an Active Matrix OLED (AMOLED) display device, an LED, a speaker, and a monitor.

In accordance with the present disclosure, there are provided a memory controller having improved map update performance and a method of operating the memory controller.

While the disclosure illustrates and describes specific embodiments, it will be apparent to those skilled in the art in light of the present disclosure that various changes and modifications may be made without departing from the spirit and scope of the invention as defined in the following claims.

What is claimed is:

1. A memory controller for controlling a memory device, comprising:
    a map buffer configured to include storage areas respectively corresponding to one or more indices, wherein each of the one or more indices corresponds to different logical addresses; and
    a map update controller configured to generate metadata corresponding to a first logical address based on the first logical address received from an external, to store the metadata in a first storage area among the storage areas, corresponding to a target index among the one or more indices and to overwrite the metadata in the first storage area of the target index when mapping data for the first logical address is updated,
    wherein the metadata includes the first logical address, an old physical address previously mapped to the first logical address, and a new physical address currently mapped to the first logical address.

2. The memory controller according to claim 1, wherein the map update controller is configured to validate the target index when the metadata is stored in the first storage area.

3. The memory controller according to claim 2, wherein the map update controller is configured to flush the metadata stored in the map buffer into the memory device when a number of valid indices, among the one or more indices, reaches a set number of valid indices.

4. The memory controller according to claim 1, wherein the map update controller is configured to flush the metadata stored in the map buffer into the memory device in response to a flush request received from a host.

5. The memory controller according to claim 1, further comprising:
    a sudden power-off sensor configured to generate a sensing signal based on sensing a sudden power-off occurring in the memory device.

6. The memory controller according to claim 5, wherein the map update controller is configured to flush the metadata stored in the map buffer into the memory device in response to the sensing signal.

7. The memory controller according to claim 1, wherein the map update controller is configured to store metadata corresponding to a second logical address different from the first logical address in the map buffer based on mapping data for the second logical address or overwrite the metadata corresponding to the second logical address, stored in the map buffer, depending on whether the metadata corresponding to the second logical address is stored in the map buffer, and wherein the metadata corresponding to the second logical address includes the second logical address, an old physical address previously mapped to the second logical address, and a new physical address currently mapped to the second logical address.

8. The memory controller according to claim 7, wherein the map update controller is configured to store the metadata corresponding to the second logical address in a second storage area corresponding to an index different from the target index, among the one or more indices.

9. The memory controller according to claim 1, wherein the map update controller is configured to invalidate the one or more indices when the metadata stored in the map buffer is flushed into the memory device.

10. The memory controller according to claim 1, wherein the map update controller or a processor is configured to sequentially increase the target index when new metadata is stored in the map buffer.

11. A method of operating a memory controller, the memory controller controlling a memory device and including a map buffer with storage areas respectively corresponding to one or more indices, the method comprising:

generating metadata corresponding to a first logical address based on the first logical address received from an external, wherein the metadata includes the first logical address, an old physical address previously mapped to the first logical address, and a new physical address currently mapped to the first logical address;

storing the metadata in a first storage area among the storage areas, corresponding to a target index among the one or more indices; and overwriting the metadata stored in the first storage area of the target index when mapping data for the first logical address is updated, wherein each of the one or more indices corresponds to different logical addresses.

12. The method according to claim 11, further comprising validating the target index when the metadata is stored in the first storage area corresponding to the target index.

13. The method according to claim 11, further comprising flushing the metadata stored in the map buffer into the memory device.

14. The method according to claim 13, wherein flushing the metadata includes flushing the metadata stored in the map buffer into the memory device when a number of valid indices, among the one or more indices, reaches a set number of valid indices.

15. The method according to claim 13, wherein flushing the metadata includes flushing the metadata stored in the map buffer into the memory device in response to a flush request received from a host.

16. The method according to claim 13, wherein flushing the metadata includes flushing the metadata stored in the map buffer into the memory device when a sudden power-off occurring in the memory device is sensed.

17. The method according to claim 14, further comprising invalidating the one or more indices when the metadata stored in the map buffer is flushed into the memory device.

18. The method according to claim 11, further comprising:

when mapping data for a second logical address different from the first logical address is updated, determining whether metadata corresponding to the second logical address is stored in the map buffer; and storing the metadata corresponding to the second logical address in the map buffer or overwriting the metadata corresponding to the second logical address, stored in the map buffer, based on a result of the determination, wherein the metadata corresponding to the second logical address includes the second logical address, an old physical address previously mapped to the second logical address, and a new physical address currently mapped to the second logical address.

19. The method according to claim 11, further comprising sequentially increasing the target index when new metadata is stored in the map buffer.

* * * * *